(No Model.) 4 Sheets—Sheet 3.
A. B. WILLCOX & E. NORTON.
MACHINE FOR SOLDERING SIDE SEAMS OF CANS.
No. 382,344. Patented May 8, 1888.
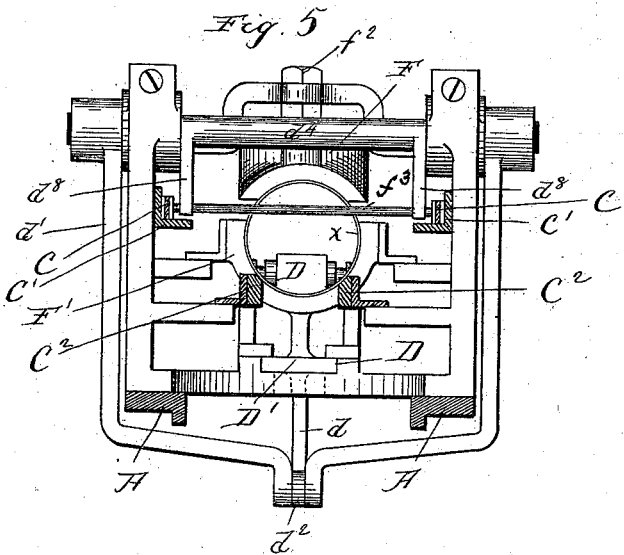
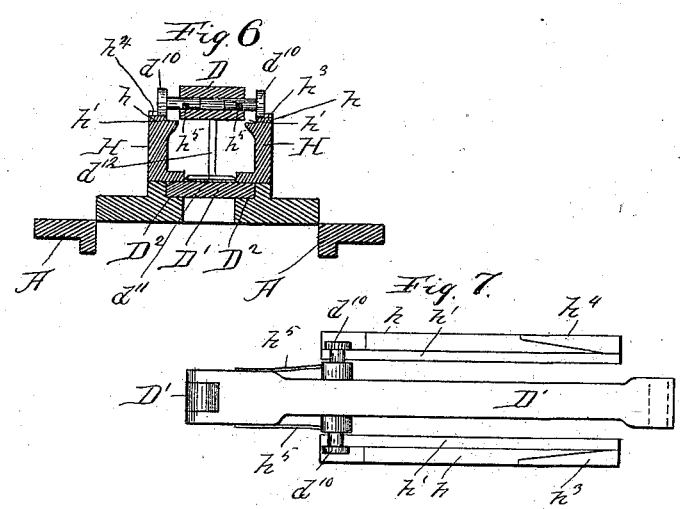
Witnesses:
Inventors:
Alfred B. Willcox.
Edwin Norton.
By Munday, Evarts and Adcock,
their Attorneys.

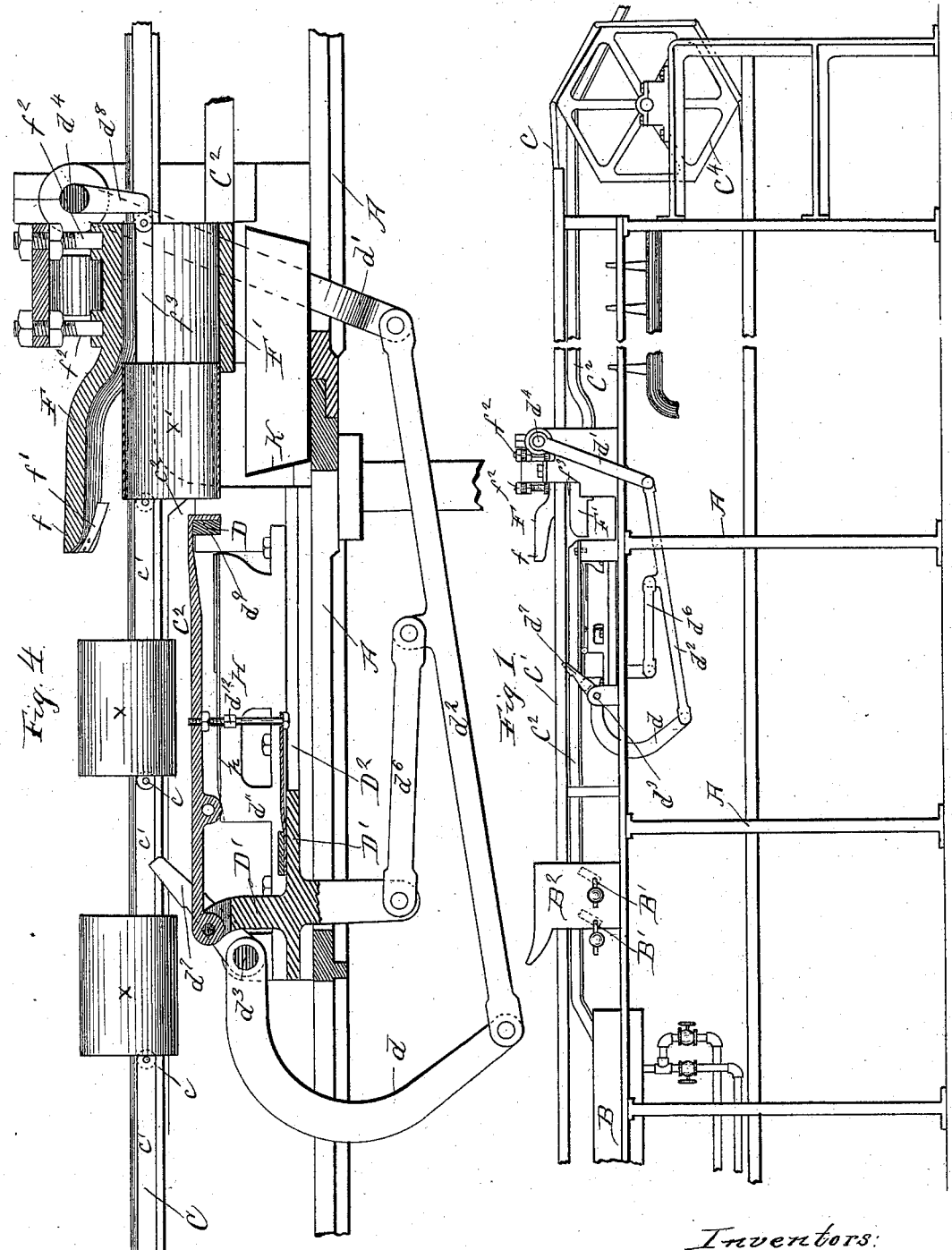

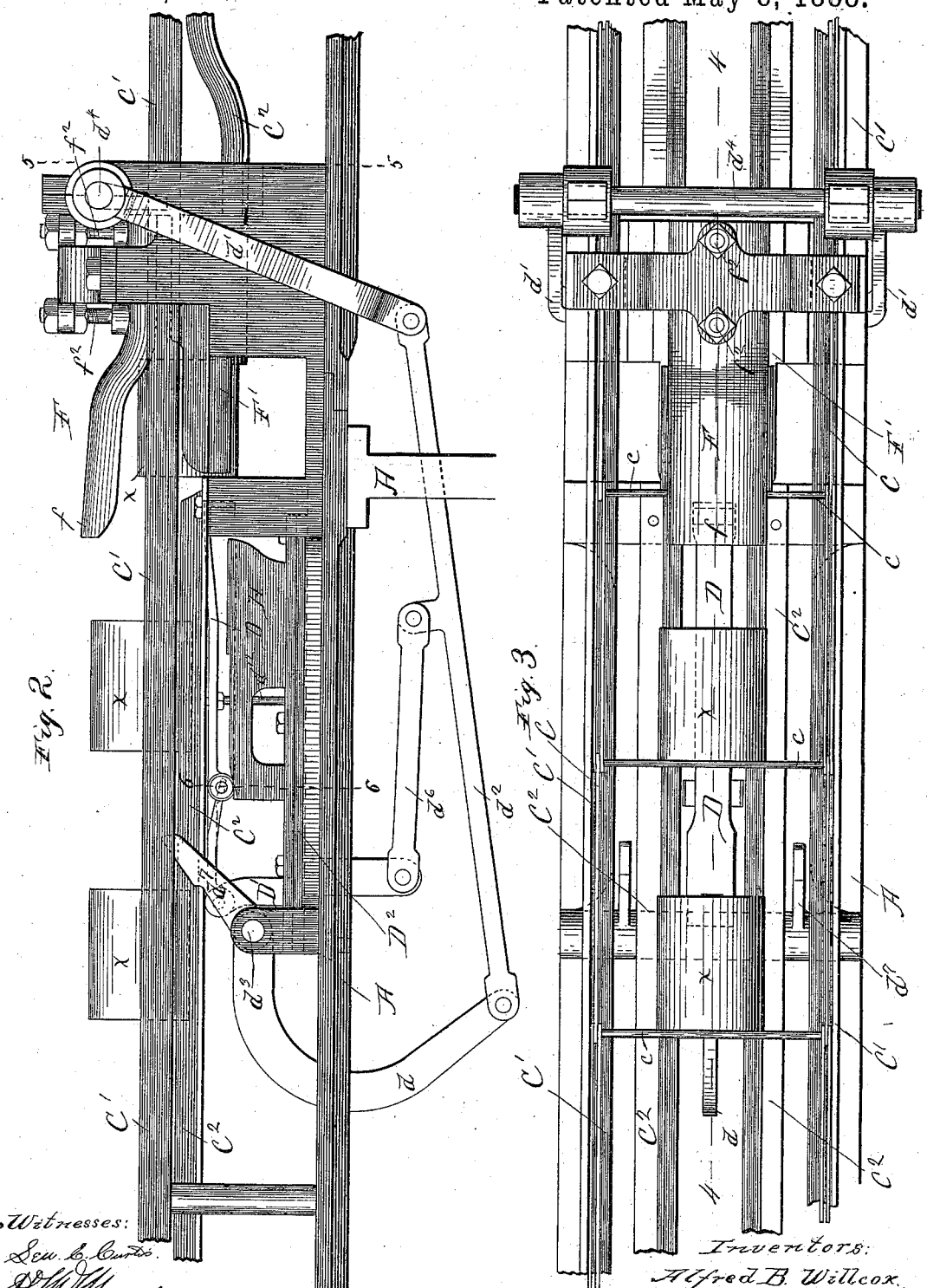

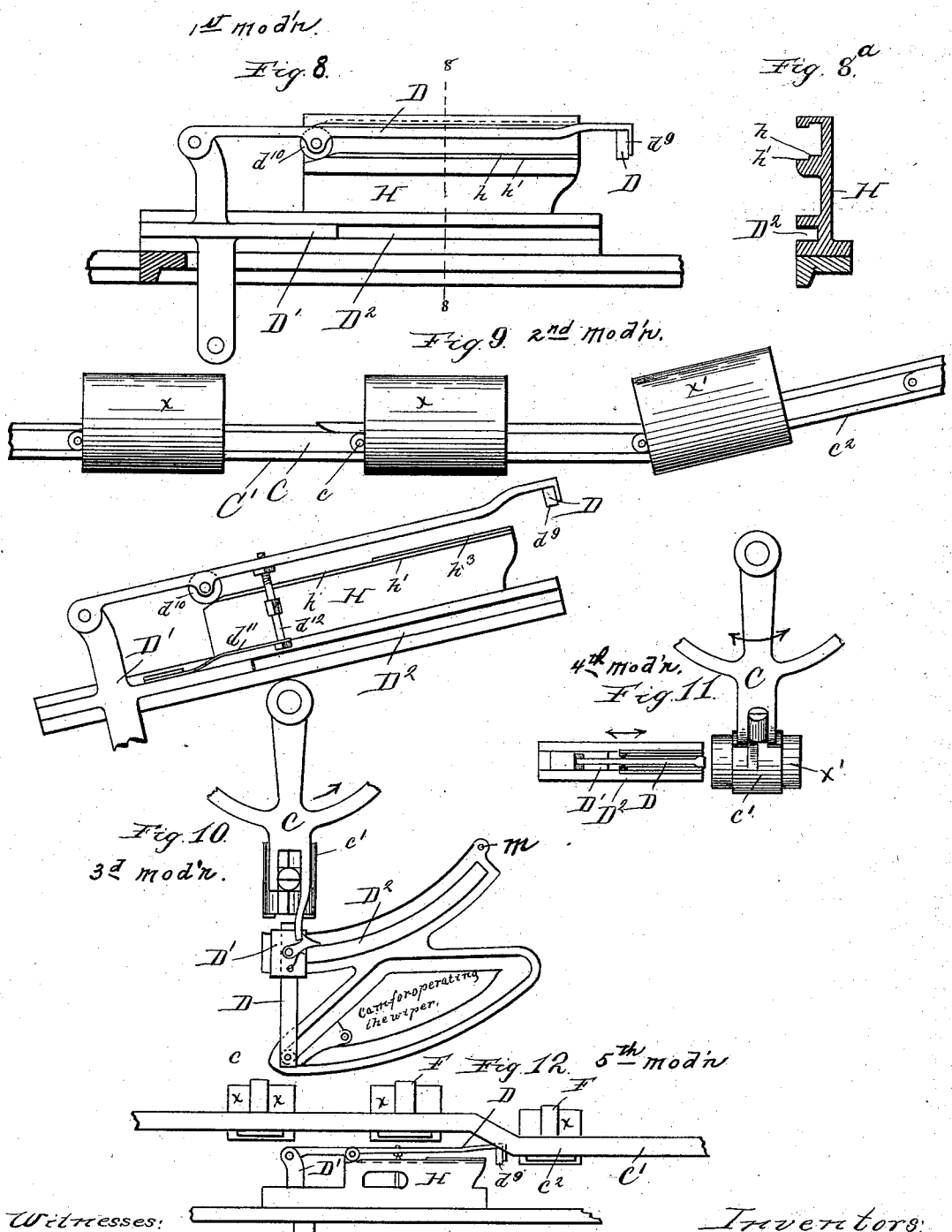

UNITED STATES PATENT OFFICE.

ALFRED B. WILLCOX AND EDWIN NORTON, OF MAYWOOD, ASSIGNORS TO SAID NORTON, AND OLIVER W. NORTON, OF CHICAGO, ILLINOIS.

MACHINE FOR SOLDERING SIDE SEAMS OF CANS.

SPECIFICATION forming part of Letters Patent No. 382,344, dated May 8, 1888.

Application filed December 27, 1887. Serial No. 258,943. (No model.)

*To all whom it may concern:*

Be it known that we, ALFRED B. WILLCOX and EDWIN NORTON, citizens of the United States, residing in Maywood, in the county of Cook and State of Illinois, have invented a new and useful Improvement in Machines for Soldering Side Seams of Cans, of which the following is a specification.

This invention relates to side-seam soldering machines, and more particularly to improvements upon the machine heretofore patented to said Edwin Norton in Letters Patent No. 250,096 of November 29, 1881, and that patented to said Edwin Norton and John G. Hodgson in Letters Patent No. 307,135 of October 28, 1884. In said first-mentioned machine the can is conveyed along in a horizontal position by a suitable carrier (with its side seam down) and its seam immersed in a solder bath, and after issuing from the solder bath the seam is wiped on the outside and the surplus solder removed therefrom by a wiper located farther along in the path of the carrier, and into contact with which the can is brought by the carrier itself, the can being drawn through a stationary hood or clamp to keep the can or its seam in contact with the wiper. In this machine no means is provided for wiping the seam on the inside, which is almost equally desirable. In said later patent the seam is wiped both on the outside and inside by a reciprocating or movable wiper after the can issues from the solder bath, the can being also held against or so as to resist the action of the wiper by a suitable clamp or holder which is movable with or mounted upon the carrier itself, instead of upon the stationary frame of the machine, as in said former patent, the movement of the carrier being arrested during the operation of the reciprocating or movable wiper.

Our present improvement consists in the combination, with a soldering bath or device and a continuously-moving can-carrier, of a reciprocating inside wiper for wiping the inside of the seam. By this means we are enabled to wipe the seam upon the inside of the can in a positive and effectual manner without stopping the can-carrier, the continuous movement of which is of great importance in this class of machines, as the wiping, to be effectual, must be done as soon as practicable after the seam is immersed in the molten solder, and before it begins to set. The continuous movement of the can-carrier is also desirable, as it materially increases the capacity of the machine.

It further consists, in connection with a soldering bath or device and a continuously-moving can-carrier of a hood, clamp, or holder for holding the can so as to properly resist the action of the wiper.

It further consists, in combination with a can-carrier whereon the cans are placed longitudinally of the direction of movement of the carrier, of an inside wiper reciprocating parallel or about parallel to the can-carrier track or to the direction in which the can carried thereon moves, the reciprocating movement of the wiper being faster than that of the carrier.

It further consists in the novel devices and novel combinations of devices or parts herein shown and described, and more particularly pointed out in the claims.

In the accompanying drawings, forming part of this specification, we have shown our improvement as applied to the side-seam-soldering machine shown and described in said Patent No. 250,096, as we deem that to be the best construction now known to us for practicing the same. Our invention may, however, be applied to other soldering-machines employing different kinds of carriers for conveying the can.

In said drawings, Figure 1 is a side elevation of a device or apparatus embodying our invention, the drawings showing, however, only one end of the complete soldering-machine—the end or part of the same to which our improvement is applied. Fig. 2 is an enlarged side elevation. Fig. 3 is a plan view. Fig. 4 is a vertical section on line 4 4 of Fig. 3. Fig. 5 is a cross section on line 5 5 of Fig. 2. Fig. 6 is a cross-section on line 6 6 of Fig. 2, and Fig. 7 is a plan view of the slideway for the reciprocating wiper. Fig. 8 shows a modification in which the guide for the wiper serves to press it against the can during the wiping operation without the use of a spring, the guide itself acting as a cam to force the wiping end of the pivoted wiper-arm against the seam. Fig. 8ᵃ is a section on line 8 8 of Fig. 8. Fig.

9 shows a modified form of the deflected portion of the can-carrier path, the can-carrier path being given simply a single bend or angle to enable the wiper to enter the can. Figs. 10 and 11 illustrate methods of applying the invention to can-carriers such as shown and described in said Patent No. 307,135. Fig. 12 shows a modification in which the can-carrier chain is furnished with can holding or clamping devices, and in which the depression is formed in the chain-track.

In the drawings similar letters of reference indicate like parts in all the figures.

In said drawings, A represents the frame of the machine; B, the solder bath or a portion of the same; B', the wiper for wiping the outside of the seam; B$^2$, the hood or clamp for holding the can in contact with such wiper, and through which the can passes.

C is the can-carrier chain; c, its cross-bars, which push or propel the cans; C', the track for such carrier-chain; and C$^2$, the track or guideway upon which the can rides, as in this construction the pockets or receptacles c' to receive the cans, and formed by the cross-bars c of the carrier, are adapted simply to push the cans forward without bodily supporting them.

C$^3$ is the guide above the solder bath, and C$^4$ is one of the pulleys around which the chain travels. All these parts are of the same construction as shown and described in said first-mentioned patent, No. 250,096. In lieu of such chain can-carrier and its track other suitable can-carriers adapted to carry the cans and immerse them in a molten-solder bath may be employed.

D represents the inside reciprocating wiper, and D' the cross-head, to which it is connected and by which it is actuated. The cross-head is reciprocated back and forth in a suitable guideway, D$^2$, on the frame of the machine. The cross-head D' is reciprocated in one direction by a lever, d, and in the other direction by a bent lever, d', the two levers being connected by a pivoted link, d$^2$. The lever d is pivoted at d$^3$ to the frame of the machine below the chain-carrier track, and the bent lever d' is pivoted to the frame above the carrier-track at d$^4$. The two levers are connected together by a pivoted link or bar, d$^2$, which bar is connected to the cross-head by a connecting-link, d$^6$. The short arms d$^7$ d$^8$ of the levers d d' project in the path of the chain carrier C, so that the cross-bars c thereof will operate the levers, and thus reciprocate the cross-head back and forth once for each can pocket or receptacle on the chain carrier. The track or guideway C$^2$, upon which the can rides as it is propelled forward by the chain carrier C, is furnished with a bend, jog, depression, or offset, c$^2$, at the place where the wiper operates upon the can, so that the wiper, which is located beneath the can-track, may enter the can at its end and pass inside the same. This is clearly shown in the drawings at Fig. 4 and also in Fig. 2. By reference to Fig. 4 it will be seen that by reason of this depression, bend, or change of direction in the path of the cans as they are carried along by the carrier the cans marked x x are above the wiper, while the preceding can, (marked x',) which has advanced to the depressed portion of the can-track, is on about a level with the wiper D, so that the wiper may enter the can at its end. At this depressed or deflected portion of the path of the can or of the can-carrier the machine is furnished with a stationary holding or guiding device, F, preferably in the form of a hood or clamp, through which the can is drawn by the carrier-chain and which serves to hold or guide the can while acted upon by the wiper. This hood or guide should in cross section preferably be round or conform in cross-section to that of the can, so that it will also serve to true or shape the can into cylindrical form while its seam is being wiped, in order that after the can is wiped and issues from the hood F it may be of true shape when the solder becomes set. By making this guide-hood F of the same diameter and shape of the can it also serves to present the seam to be wiped in the same relative position to the reciprocating wiper. The mouth of the hood F is curved upward, as shown at f, to correspond to the bend or offset c$^2$ in the can-track C$^2$. Its mouth is made flaring, so that the can will readily enter the same, and it is furnished with a light flat spring, f', to better steady and guide the can as it enters the deflected portion of the can-track C$^2$. The lower circular half or part, F', of this guide or holder F, in fact, forms part of the can-track. The upper part, F, of the hood is adjustably connected to the frame of the machine by adjusting screws f$^2$ f$^2$, so that it may be adjusted up or down to properly fit the can passing under the same. The chain C passes through a slot or opening, f$^3$, in the hood. The wiper D is guided so that its brush or wiping end d$^9$ will be somewhat elevated above the seam as it enters the can and then pressed against the seam, so as to wipe the same, as the wiper makes its backward movement by means of a cam or guideway, H. This cam or guideway has one high track, h, upon which the pins or rollers d$^{10}$ of the wiper ride as the wiper makes its advance or entering movement into the can, and one lower track or guide-groove, h', in or upon which said rollers or pins ride as the wiper makes its receding or wiping movement. The pins or rollers d$^{10}$ are moved in and out or switched from one track or way h h' to the other by inclines or switch-cams h$^3$ h$^4$ at the ends of said tracks. If desired, springs h$^5$ may be employed to switch the pins or rollers d$^{10}$ at one end. The lower carrier guide-groove, h', will serve to force the wiper against the seam of the can as the wiper is drawn back through the same. However, a spring, d$^{11}$, attached to the cross-head D and connected to the wiper by an adjusting screw, d$^{12}$, may be employed in addition to the guideway h', or as a substitute for the same, in which case, as shown in the drawings, the guideway $h'$ is so located or arranged as to permit the spring to act. By a simple and very slight change in the relative location of the guideway $h'$ said guide will, as is obvious to those skilled in the art, operate without the spring to force or press the wiper against the seam of the can. This construction, where the guideway $h'$ is without the spring to press the wiper against the seam, is illustrated in Figs. 8 and $8^a$, and the operation is precisely the same as that shown in Figs. 1 to 6 and before described, the roller $d^{10}$ being switched from the track $h$ to the track $h'$ by the same means. The only difference in the construction is that in Figs. 8 and $8^a$ the guideways $h\,h'$ are made in the form of grooves, so as to bear also on top of the roller $d^{10}$.

The levers $d\,d'$ being connected at their long arms to the cross-head of the wiper and their short arms being operated by the continuously-moving can-carrier C the wiper of course moves faster than the carrier and will cause the wiper to overtake the moving can after it reaches the depressed portion of its path, enter inside the can, and then reciprocate backward out of the same and out of the way of the next succeeding can before such succeeding can reaches the depressed portion $c^2$ of the track $C^2$.

The short arms of both the levers $d\,d'$ should project into the path of the carrier-chain near the wiper and at a point relatively near or only a few links distant from the link of the chain carrying the can being operated upon by the wiper, as shown in the drawings, so that the slack in or wear of the chain will not interfere with the movements of the wiper being made in proper time. Where the carrier-chain is long and composed of many links, the slack in the chain would materially affect the proper timing of the wiper if one of the operating-levers projected into the path of the carrier many links distant from the link carrying the can being operated upon—as, for example, if one of the levers projected into the returning line of the chain.

A pan, K, below the hood F F', receives the solder wiped from the inside of the can by the wiper D.

As shown in the drawings, the wiper and its cross-head reciprocate in a direction parallel to the can-carrier track $C^2$, and the deflected portion $c^2$ is also, except at its beginning, parallel to the track $C^2$. This is the preferable construction; but it is obvious that if the path of the carrier is simply given a deflection, the wiper may readily enter at the deflection, and that the part of the deflected portion $c^2$ where the wiping is done need not be parallel to the preceding part of the track. This construction or modification is illustrated in Fig. 9.

In Fig. 9 the wiper is operated by the same means as before described, the only difference being in the form of the deflection in the path of the can-carrier.

In applying our invention to such a can-carrier as is shown in said Patent No. 307,135 the can-holders would want to be set at right angles to the radius of the carrier, instead of radially, as shown, when the carrier may be revolved continuously; or else the reciprocating wiper should be mounted upon an oscillating slide having the same movement as the carrier during the wiping operation. These modifications are illustrated in Figs. 10 and 11. As shown in Fig. 10, the can-holder $c'$ is arranged radially with the revolving can-carrier C, and the slide or guide D', in which the wiper D reciprocates, oscillates back and forth in a guideway, $D^2$, so that the slide D' may have the same movement as the can-holder while the wiping is being done. The wiper D may be reciprocated in and out of the can by a stationary grooved cam. In this construction the oscillating slide D' should be provided with a spring-pawl, which is engaged by a finger or projection on the revolving carrier, as shown in the drawings, so that the carrier itself may move the slide D' in its guideway $D^2$. The spring-pawl may be released from engagement with said finger or projection by striking against a pin, $m$, which is shown at the end of the guideway $D^2$ in Fig. 10. A spring may preferably be used for giving the slide D' its return movement. In Fig. 11 the can-holder $c'$ is arranged at right angles to the radius of the can-carrier C, and the slide D' of the wiper D may be reciprocated in its guideway $D^2$ by any suitable mechanism connecting it with some moving part of the machine. This connecting or operating mechanism may be similar in construction to that before described in relation to the other figures.

We desire it to be understood that in practicing our invention the clamp F, which resists the action of the wiper, may, if desired, be mounted upon the can-carrier itself and thus also constitute the pocket or receptacle in the carrier for holding the can, like, for example, the can-carrier shown and described in said Patent No. 307,135, above referred to. As shown in the drawings, the can rests loosely between the links of the can-carrier chain and the track for this chain is straight and furnished with no depressed portion corresponding to the depressed portion $c^2$ of the track or guideway $C^2$, along which the can is carried, such depression in the chain-track being unnecessary, as the can slides and rests upon the track or guideway $C^2$, and as the necessary extent or depth of such depression to give room for the wiper to enter the can is less than the diameter of the can ordinarily. In soldering the side seams of very small cans, however, it may be desirable to give the track or guideway of the chain carrier a similar depression or offset. If a deflection is made in the chain-track, it will be similar to the deflection $c^2$ in the track $C^2$, and the illustration of the one will serve for both, so that the skilled mechanic cannot fail to understand how to make the necessary deflection in the chain-track in case where it is desirable. It should also be observed that where the can is supported or rests upon the carrier-chain itself, the same being provided with suitable pockets or holders for supporting the can, which is an old construction of can-carrier chain well known to those skilled in the art, the depression or offset $c^2$ will of course be formed in the track or guideway of the carrier-chain, as in such case a separate track or guideway is not necessary for the cans to rest upon. The essential feature is that the bend or depression be in a track along which the can is carried, and it is immaterial whether the track or guideway along which the can is carried be one upon which the can rests directly or one upon which the carrier or device holding the can rests and rides, as in either case the path of the can is given the requisite deflection or bend to permit the reciprocating wiper to enter the same.

If it is desired to wipe the can upon the outside by our reciprocating wiper while the can is carried continuously upon the cam, this of course may be done without giving the path of the can any inclination or depression, the guideway for the cross-head of the wiper being simply arranged in proper position to cause the wiper to operate upon the outside of the can.

The head or clamp F, which serves to hold the can or to resist the action of the wiper, is preferably mounted on the stationary frame of the machine, as in this way but a single hood is required for all the links or can-holders of the carrier. This hood, however, may be movable with or form part of the carrier, in which case a separate hood will be employed for each link or can-holder of the carrier, as shown, for example, in said Patent No. 307,135, before referred to.

In the modification shown in Fig. 12 the can-carrier chain is provided with a series of hoods, F, to hold the cans so as to resist the action of the wiper D, and the deflection which enables the wiper to enter the can is formed in the chain-track C'. In this construction the wiper is or may be operated by the same mechanism as that before described in relation to the other figures.

We are aware of the patent to Hipperling, No. 366,482, of July 12, 1887, and hereby disclaim the wiping device therein shown and described as not of our invention. In this Hipperling device the wiper is stationary, having no longitudinal movement in respect to the can being wiped, and the wiping is done by the can-carrier moving the can against and in contact with the stationary wiper. In our invention the wiper itself has a bodily-reciprocating movement and is combined to act in conjunction with a continuously-moving can-carrier.

We claim—

1. The combination, in a soldering-machine, of a continuously-moving can-carrier with a reciprocating inside wiper for wiping the inside of the seam while the can is being moved in the carrier, substantially as specified.

2. The combination, in a soldering-machine, of a continuously-moving can-carrier with a reciprocating wiper and a clamp device for holding the can to resist the action of the wiper, substantially as specified.

3. The combination of a can-carrier having receptacles to receive the can longitudinally of the direction of movement of the carrier, means for deflecting or inclining the path of the can as it is carried by said carrier, and an inside reciprocating wiper adapted to enter the can, substantially as specified.

4. In a soldering-machine, the combination, with a solder bath, of a can-carrier chain, a track for said carrier, a guideway or track for the can, having a deflected portion, and an inside reciprocating wiper entering the can at the deflected portion thereof, substantially as specified.

5. In a soldering-machine, the combination, with a solder bath, of a continuously-moving can-carrier chain, a track for said carrier, a guideway or track for the can, having a deflected portion, and an inside reciprocating wiper entering the can at the deflected portion thereof, and mechanism for giving the wiper a quicker motion than that of the can-carrier, substantially as specified.

6. In a soldering-machine, the combination, with a solder bath, of a continuously-moving can-carrier chain, a track for said carrier, a guideway or track for the can, having a deflected portion, and an inside reciprocating wiper entering the can at the deflected portion thereof, and mechanism for giving the wiper a quicker motion than that of the can-carrier, said motion-giving mechanism consisting in a pair of levers operated by the can-carrier and connected with said wiper, substantially as specified.

7. The combination, in a soldering-machine, of a can-carrier, a movable wiper, a lever projecting in the path of the carrier and connected with said wiper, whereby the wiper is moved bodily along and in contact with the seam of the can to be wiped by the movement of the carrier, substantially as specified.

8. The combination, in a soldering-machine, of a can-carrier, a movable wiper, a pair of operating-levers projecting in the path of said carrier, a pivotal link connecting said levers, a cross-head, and a link connecting said cross-head and pivotal link, substantially as specified.

9. The combination, in a soldering-machine, of a can-carrier, a pivoted and reciprocating wiper, D, and a cam or track for guiding the free or wiping end of said wiper, substantially as specified.

10. The combination, in a soldering-machine, of a can-carrier, a pivoted and reciprocating wiper, D, and a cam or track for guiding the free or wiping end of said wiper, said carrier or track having a raised portion to lift the wiper from the seam as the wiper moves in one direction and a lower portion to guide the wiper against the seam as it moves in the opposite direction, substantially as specified.

11. The combination, in a soldering-machine, of a can-carrier, a pivoted reciprocating wiper, D, and a cam or track for guiding the free or wiping end of said wiper, said cam or track having a raised portion to lift the wiper from the seam as the wiper moves in one direction and a low portion to guide the wiper against the seam as it moves in the opposite direction, said wiper being furnished with a laterally-sliding guide pin or roller, and said cam or track being furnished with an incline at one end for sliding said guide-pin from the high to the low track, substantially as specified.

12. The combination, in a soldering-machine, of a can-carrier, a pivotal reciprocating wiper, D, and a cam or track for guiding the free or wiping end of said wiper, said cam or track having a raised portion to lift the wiper from the seam as the wiper moves in one direction and a low portion to guide the wiper against the seam as it moves in the opposite direction, and a spring to force the wiper against the seam, substantially as specified.

13. The combination, in a soldering-machine, of a continuously-moving can-carrier, a movable wiper, and a pair of wiper-operating levers having short arms projecting in the path of said carrier and long arms connected with said wiper, whereby the wiper is moved faster than the carrier, substantially as specified.

14. The combination, with a can-carrier chain, of a movable wiper and a pair of wiper-operating levers, both having arms projecting in the path of said carrier-chain near the wiper and relatively near the link of the chain carrying the can being operated upon by the wiper, so that the slack in or wear of the links of the chain will not materially affect the operation of the wiper in its proper order or time, substantially as specified.

15. The combination, with a link-chain can-carrier, of a reciprocating wiper and device for holding or guiding the can to resist the action of the wiper, substantially as specified.

16. The combination, with a can-carrier, of a movable wiper and a stationary can holding or guiding device into or through which the can is carried by the carrier to resist the action of the wiper, substantially as specified.

17. The combination, with a continuously-moving can-carrier, of a reciprocating-wiper and a stationary can-holding device through which the can is drawn by the carrier, substantially as specified.

18. The combination, with a link-chain can-carrier, of a reciprocating wiper and a stationary can-holding device having a slot or opening for the can-carrier to pass through, substantially as specified.

19. The combination, with a can-carrier, of an inside reciprocating wiper, means for inclining or deflecting the path of the can carried by said carrier, and a can-holding device to resist the action of the wiper, substantially as specified.

20. The combination, in a soldering-machine, of a track or guideway along which the can is carried, having a deflected portion, with an inside reciprocating wiper entering and reciprocating inside the can while the same is at such deflected portion of said track or guideway, substantially as specified.

21. The combination, in a soldering-machine, of a track or guideway along which the can is carried, having a deflected portion, with an inside reciprocating wiper entering and reciprocating inside the can while the same is at such deflected portion of said track or guideway, and a can holding or guiding hood to resist the action of the wiper, substantially as specified.

22. The combination, in a soldering-machine, of a track or guideway along which the can is carried, having a deflected portion, with an inside reciprocating wiper entering and reciprocating inside the can while the same is at such deflected portion of said track or guideway, a continuously-moving can-carrier, and means for reciprocating said wiper with a faster motion than that of the carrier, substantially as specified.

ALFRED B. WILLCOX.
EDWIN NORTON.

Witnesses:
H. M. MUNDAY,
R. H. MUNDAY.